US006295919B1

(12) United States Patent
Leboisne

(10) Patent No.: US 6,295,919 B1
(45) Date of Patent: Oct. 2, 2001

(54) REINFORCED IMPACT-EMBRITTLED BRAKING DEVICE

(75) Inventor: Cédric Leboisne, Paris (FR)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 09/424,747

(22) PCT Filed: Oct. 18, 1999

(86) PCT No.: PCT/FR99/02535

§ 371 Date: Nov. 29, 1999

§ 102(e) Date: Nov. 29, 1999

(87) PCT Pub. No.: WO00/23307

PCT Pub. Date: Apr. 27, 2000

(30) Foreign Application Priority Data

Oct. 20, 1998 (FR) .................................................. 98 13187

(51) Int. Cl.⁷ ...................................................... F16J 10/00
(52) U.S. Cl. ............................................ 92/169.3; 60/582
(58) Field of Search .......................... 92/169.3; 91/369.1; 60/582

(56) References Cited

U.S. PATENT DOCUMENTS 5,410,880 * 5/1995 Schluter ............................... 92/169.3

\* cited by examiner

*Primary Examiner*—Edward K. Look
*Assistant Examiner*—Thomas E. Laz
(74) *Attorney, Agent, or Firm*—Leo H. McCormick, Jr.; Warren Comstock

(57) ABSTRACT

A braking device having a flange (21) of master cylinder (2) secured to a pneumatic booster (1) by a nut (3) screwed onto a through-bolt (13) that extends through a front shell (111) and a rear shell (112). The through-bolt (13) has a threaded front end (131) and a shoulder (132) for holding a front wall (111) in alignment with the master cylinder (2). The nut (3) has a barrel engaged in a hole (211) in the flange (21) and is screwed onto the front end (131). A collar (32) on the nut (3) acts on the flange (21) to press the flange (21) against the front shell (111). The barrel (31) of the nut and shoulder (132) of the through-bolt (13) have first and second respective sections (S1, S2) which face each which engage the front shell (111) with the first section (S1) being larger than the second section (S2) such that the front shell (111) crumples on receipt of a impact force.

3 Claims, 2 Drawing Sheets

REINFORCED IMPACT-EMBRITTLED BRAKING DEVICE

The present invention relates to a braking device for a vehicle, comprising a pneumatic booster, a master cylinder and a securing nut, the booster comprising in particular a rigid casing, a moving partition and a through-bolt, the casing comprising a front shell and a rear shell forming respective walls for a front chamber and a rear chamber which are defined inside the casing and separated from one another by the moving partition, the through-bolt passing through the front shell and rear shell in an axial direction in order to join these together, and having a threaded front end outside the front chamber and a shoulder on which the front shell rests inside the front chamber, the master cylinder comprising a flange pierced with a hole through which the front end of the through-bolt passes.

BACKGROUND OF THE INVENTION

Boosters of this type are known in the prior art, and an example of one is given in patent document DE-2,830,262.

The presented invention rests on the discovery that boosters with through-bolts, although displaying the advantage of exhibiting a very satisfactory overall rigidity for a relatively small casing thickness, also have the drawback of being able to transmit very high forces towards the driver in the event of an accidental frontal impact on the vehicle.

SUMMARY OF THE INVENTION

The object of the invention consists precisely in avoiding the transmitting to the driver of the forces of the impact received by a braking device employing a booster with through-bolts.

To this end, the device of the invention, which in other respects is in accordance with the above preamble, is essentially characterized in that the securing nut has a barrel engaged in the hole in the flange and screwed onto the front end of the through-bolt, and a collar pressing the flange against the front shell, in that the barrel of the nut and the shoulder of the through-bolt have first and second respective sections facing one another, and in that the first section completely covers the second section.

By virtue of this arrangement, a frontal impact received by the master cylinder is absorbed by crumpling of the front shell, instead of being transmitted to the bulkhead by the through-bolt, as was the case in the prior art.

The through-bolt may also be of tubular shape, it being possible for the front shell itself to be crimped to the shoulder of this through-bolt.

Other features and advantages of the invention will emerge clearly from the description thereof given hereafter by way of non-limiting indication, with reference to the appended drawings.

BRIEF DESCRIPTION OF THE DRAWINGS

As seen in FIG. 1, the invention relates in general to a braking device for a vehicle, essentially comprising a pneumatic booster 1, a master cylinder 2 and a securing nut 3.

DETAILED DESCRIPTION OF THE INVENTION

Figure 1:
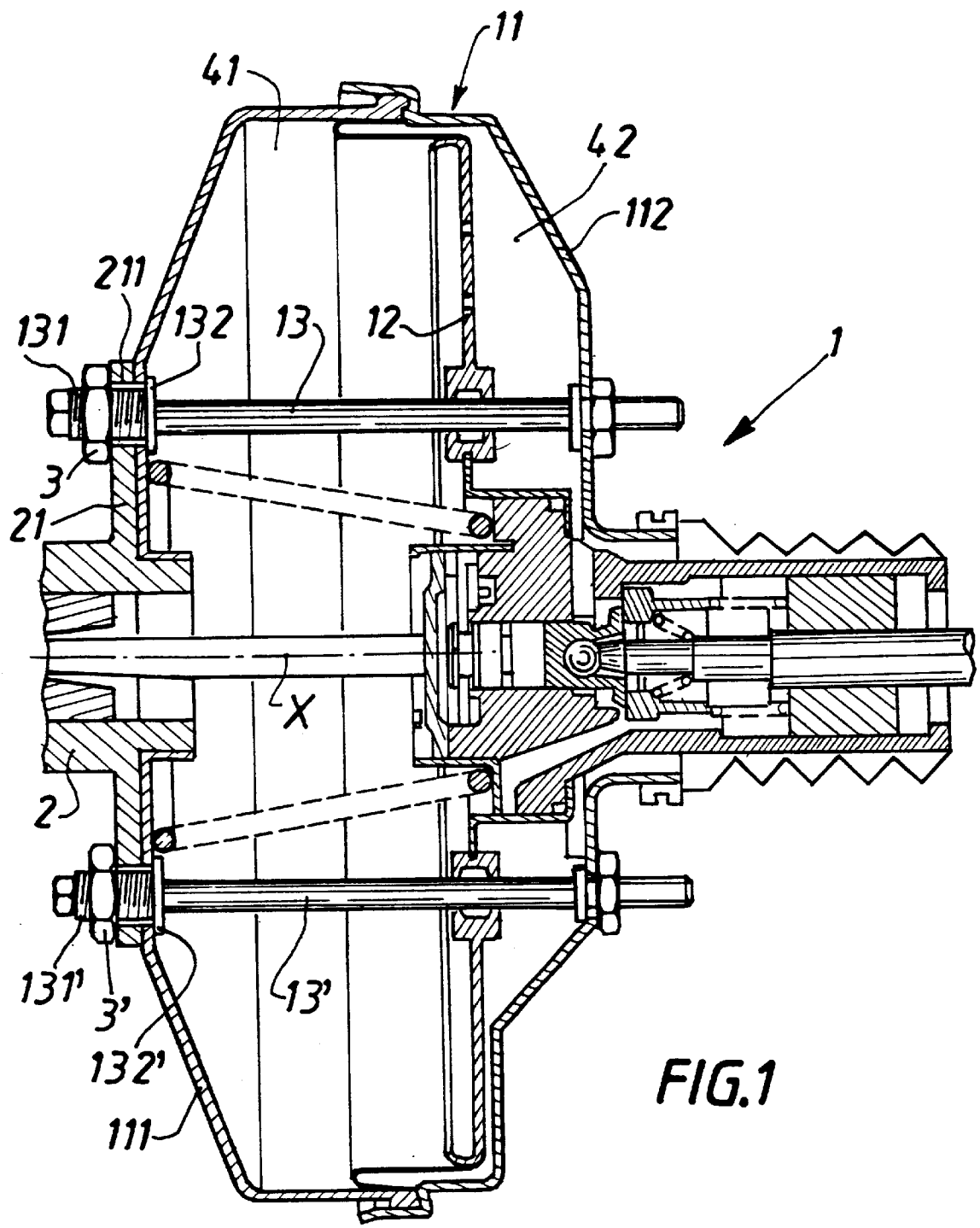
FIG. 1 is a view in part section of a known braking device employing a booster with through-bolts.

The booster 1 itself comprises in particular a rigid casing 11, a moving partition 12 and a through-bolt such as 13.

In actual fact, a booster with through-bolts generally comprises several through-bolts such as 13 and 13', analogous to the through-bolt 13, and which will, together with their surroundings, be implicitly described at the same time as the through-bolt 13 and its surroundings.

The casing 11 is made up of a front shell 111 and of a rear shell 112, which form respective walls for a front chamber 41 and a rear chamber 42 which are defined inside the casing 11 and separated from one another by the moving partition 12.

The through-bolt 13 passes through the front shell 111 and rear shell 112 in an axial direction X to join these to one another, and may consist either of a solid screw as shown in FIG. 1, or of a tube through which a screw 14 passes, as shown in FIGS. 2 to 5.

In either case, the through-bolt 13 has a threaded front end 131 outside the front chamber 41, and shoulder 132 against which the front shell 111 rests inside the front chamber 41.

The master cylinder 2 has a securing flange 21 pierced with a hole 211 through which the front end 131 of the through-bolt,13 passes.

The securing nut 3 has, on the one hand, a barrel 31 engaged in the hole 211 in the flange and screwed onto the front end 131 of the through-bolt 13 and, on the other hand, a collar 32 able to press the flange 21 against the front shell 111, the barrel 31 of the nut 3 and the shoulder 132 of the through-bolt 13 having first and second respective sections S1, S2 facing one another.

According to the invention, the section Si of the barrel 31 of the nut 3 completely covers the section S2 of the shoulder 132 of the through-bolt 13.

Figure 2:
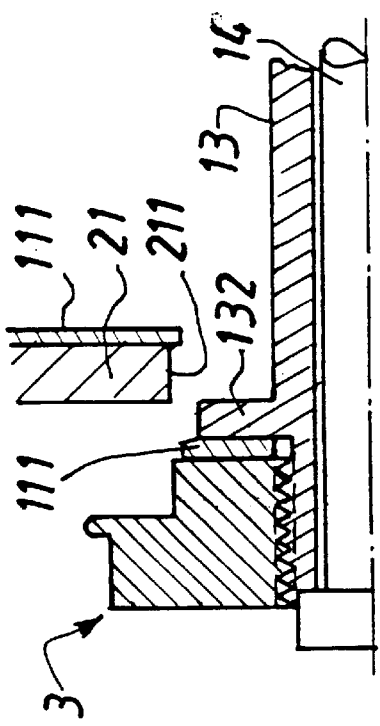
FIG. 2 is a sectioned view of the characteristic structural details of a braking device in accordance with the invention, corresponding to a first embodiment, and observed prior to an impact.
Figure 3:
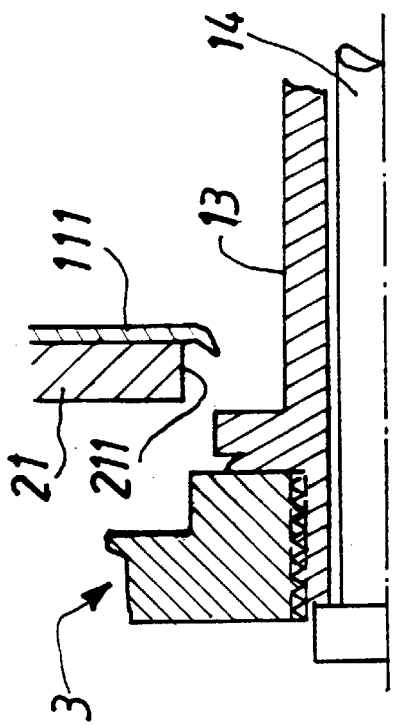
FIG. 3 is a sectioned view of the characteristic structural details of a braking device in accordance with the invention, corresponding to a first embodiment, and observed after an impact.

FIGS. 2 and 3 illustrate the benefit of the invention in a first embodiment, in which the front shell 111 is trapped between the barrel 31 of the nut 3 and the shoulder 132 of the through-bolt 13.

In this case, a frontal impact on the master cylinder 2 has the effect of shearing the sheet metal of which the front shell 111 is formed, so that the master cylinder 2 can penetrate the front chamber 4; without encountering the through-bolt 13, thus avoiding transmitting an intense axial force to it, which, by contrast, was what occurred in the prior art.

Figure 4:
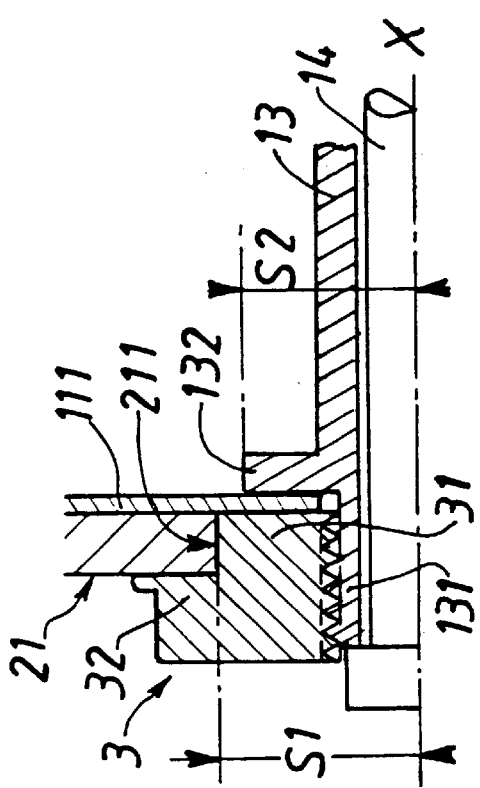
FIG. 4 is a sectioned view of the characteristic structural details of a braking device in accordance with the invention, corresponding to a second embodiment, and observed prior to an impact.
Figure 5:
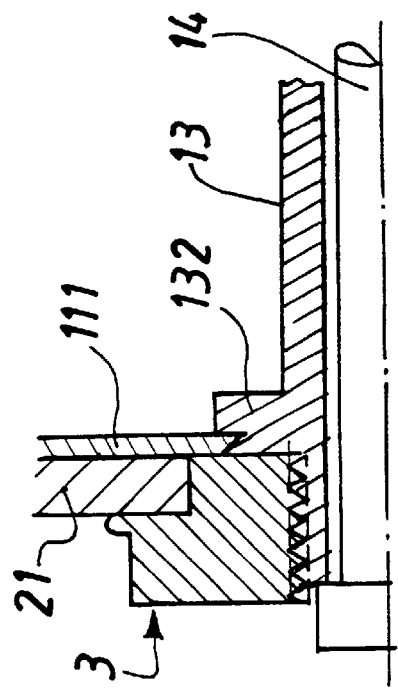
FIG. 5 is a sectioned view of the characteristic structural details of a braking device in accordance with the invention, corresponding to a second embodiment, and observed after an impact.

The benefit of the invention is also illustrated by FIGS. 4 and 5 in the case of a second embodiment in which the front shell 111 is crimped onto the shoulder 132 of the through-bolt 13.

In these conditions, a frontal impact on the master cylinder 2 has the effect of uncrimping from the shoulder 132 the sheet metal of which the front shell 111 is formed, the master cylinder 2, in this case also, being able to penetrate the front chamber 41 without interfering with the through-bolt 13.

What is claimed is:

1. A braking device for a vehicle comprising:
   a pneumatic booster, said booster having rigid casing consisting of a front shell and a rear shell, said front shell and rear shell forming respective a front wall for a front chamber and a rear wall for a rear chamber which are defined inside of the casing and separated from each other be a moving partition;
   a through-bolt passing through the front shell and rear shell in an axial direction to join said front shell to said rear shell, said through bolt having a threaded front end that extend outside of said front chamber and a shoulder on which said front wall rest inside of said front chamber;
   a master cylinder having a flange pierced with a hole through which said front end of said through-bolt passes; and
   a securing nut connecting to said front end of said through-bolt, said securing nut being characterised by a barrel engaging in said hole said flange and being screwed onto said front end of said through-bolt and a collar pressing said flange against said front shell, and in that said barrel of said securing nut and said shoulder of said through-bolt have first and second respective sections facing each other and in that said first section is larger that said second section and completely covers said second section such that an impact force applied to said master cylinder causes said first section to shear said first front wall and be absorb rather than being transmitted into said through-bolts.

2. The braking device as recited in claim 1 characterised in that said through-bolt is of tubular shape and said shoulder holds said securing nut in a substantially stationary position on receipt of said impact force.

3. The braking device as recited in claim 1 characterised in that said front shell is crimped to said shoulder of said through-bolt and in that said impact shears the crimp from the shoulder.

* * * * *